(12) United States Patent
Wilmot et al.

(10) Patent No.: US 11,487,561 B1
(45) Date of Patent: Nov. 1, 2022

(54) POST SIMULATION DEBUG AND ANALYSIS USING A SYSTEM MEMORY MODEL

(71) Applicant: Cadence Design Systems, Inc., San Jose, CA (US)

(72) Inventors: Andrew Wilmot, Carlisle, MA (US); Neeti Khullar Bhatnagar, San Jose, CA (US); Qizhang Chao, Palo Alto, CA (US); George Franklin Frazier, Lawrence, KS (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 1177 days.

(21) Appl. No.: 14/582,800

(22) Filed: Dec. 24, 2014

(51) Int. Cl.
*G06F 9/455* (2018.01)
*G06F 11/36* (2006.01)
*G06F 16/245* (2019.01)

(52) U.S. Cl.
CPC ............ *G06F 9/455* (2013.01); *G06F 11/364* (2013.01); *G06F 11/3636* (2013.01); *G06F 16/245* (2019.01)

(58) Field of Classification Search
CPC ..... G06F 9/455; G06F 11/3636; G06F 11/364
See application file for complete search history.

(56) References Cited

U.S. PATENT DOCUMENTS

| | | | |
|---|---|---|---|
| 5,548,717 A | 8/1996 | Wooldridge et al. | |
| 5,809,283 A | 9/1998 | Vaidyanathan et al. | |
| 5,815,714 A | 9/1998 | Shridhar et al. | |
| 6,331,957 B1 * | 12/2001 | Kurts | G06F 11/364 365/201 |
| 6,859,892 B2 | 2/2005 | Bolding et al. | |
| 7,020,768 B2 | 3/2006 | Swaine et al. | |
| 7,356,679 B1 | 4/2008 | Le et al. | |
| 7,478,388 B1 | 1/2009 | Chen et al. | |
| 7,529,897 B1 | 5/2009 | Waldspurger et al. | |
| 7,917,894 B2 | 3/2011 | Chen et al. | |

(Continued)

OTHER PUBLICATIONS

Agarwal, Integrating Instruction Set Simulator into a System Level Design Environment, Feb. 2013, pp. 1-73 (Year: 2013).*

(Continued)

*Primary Examiner* — Boris Gorney
*Assistant Examiner* — Bernard E Cothran
(74) *Attorney, Agent, or Firm* — Tarolli, Sundheim, Covell & Tummino LLP

(57) ABSTRACT

According to an embodiment, a system and method are provided for constructing an accurate view of memory and events on a simulation platform. The system memory view can be used with a debug and analysis tool to provide post-processing debug, including searching forward and backward in capture time of the stored memory view to analyze the events of the simulation. The memory is constructed by capturing and storing each memory execution transaction, bus transaction, and register transaction during simulation. Changes in simulation platform hardware state may also be captured and stored in a hardware state database, including switches between process threads detected during the simulation that may update a simulator register. The captured events provide observability into the OS processes, the hardware, and the embedded software of the simulation platform.

29 Claims, 5 Drawing Sheets

(56) References Cited

U.S. PATENT DOCUMENTS

| | | | |
|---|---|---|---|
| 8,229,726 B1* | 7/2012 | Magdon-Ismail | ................................ G06F 17/5022 703/14 |
| 8,271,955 B1* | 9/2012 | Lindahl | ............... G06F 11/3636 714/45 |
| 8,417,715 B1* | 4/2013 | Bruckhaus | ........ G06F 17/30994 705/26.1 |
| 8,473,269 B1 | 6/2013 | Ou et al. | |
| 8,572,606 B1 | 10/2013 | Agesen et al. | |
| 8,683,444 B1 | 3/2014 | Spycher et al. | |
| 9,262,299 B1 | 2/2016 | Wilmot et al. | |
| 9,262,305 B1 | 2/2016 | Wilmot et al. | |
| 9,430,358 B1 | 8/2016 | Thayer et al. | |
| 2002/0059054 A1 | 5/2002 | Bade et al. | |
| 2002/0162051 A1 | 10/2002 | Bolding et al. | |
| 2003/0028858 A1 | 2/2003 | Hines | |
| 2003/0149961 A1 | 8/2003 | Kawai et al. | |
| 2005/0131666 A1* | 6/2005 | Tsai | ........................ G06F 30/33 703/17 |
| 2005/0165597 A1 | 7/2005 | Nightingale | |
| 2007/0011664 A1 | 1/2007 | Yamashita | |
| 2007/0043531 A1* | 2/2007 | Kosche | ............... G06F 11/3447 702/182 |
| 2007/0192079 A1 | 8/2007 | Rompaey et al. | |
| 2007/0266376 A1 | 11/2007 | Yim et al. | |
| 2008/0133897 A1 | 6/2008 | Reid et al. | |
| 2008/0319730 A1 | 12/2008 | Clark et al. | |
| 2009/0307299 A1 | 12/2009 | Malesich et al. | |
| 2010/0153693 A1 | 6/2010 | Stall et al. | |
| 2010/0180263 A1 | 7/2010 | Lee et al. | |
| 2012/0151267 A1 | 6/2012 | Bhattacharjee et al. | |
| 2012/0179447 A1 | 7/2012 | Lin et al. | |
| 2013/0007720 A1 | 1/2013 | Cai et al. | |
| 2013/0111266 A1 | 5/2013 | Tosaka | |
| 2014/0052930 A1* | 2/2014 | Gulati | ..................... G06F 11/22 711/141 |
| 2014/0196014 A1 | 7/2014 | Spycher et al. | |
| 2015/0046920 A1 | 2/2015 | Allen | |
| 2015/0248343 A1 | 9/2015 | Ionescu et al. | |

OTHER PUBLICATIONS

Rosenberg, J., How Debuggers Work, N.Y. John Wiley, 1996, pp. 107-133. QA76.9D43 R67 1996.

Magnusson, P., et al., "SimICS/sun4m: A Virtual Workstation," Proceedings of the USENIX Annual Technical Conference, New Orleans, LA, Jun. 1998.

* cited by examiner

200

300

400

500

610

POST SIMULATION DEBUG AND ANALYSIS USING A SYSTEM MEMORY MODEL

BACKGROUND

Aspects of the present invention relate generally to the field of system development and test, and more specifically to event-driven simulation and emulation of electronics.

Simulation of hardware components can be modeled at various levels of abstraction using event-driven simulation. Processor models in combination with hardware simulators can be used to simulate cross-compiled embedded software, for example, an operating system (OS). A collection of hardware models running such embedded software is known as a simulation platform. A simulation platform may also include models of peripherals such as memory modules, the system bus, universal asynchronous receivers (UARTs), terminals, USB devices, etc.

When the simulation platform includes processor models, it is also possible for the event-driven simulation or emulation environment to simulate the behavior of the actual cross-compiled embedded software (ESW) running on the processor models within the system. However, issues often exist with incorrect or unexpected interactions between the hardware and embedded software elements of the simulation system. To debug and analyze such problems, it is useful to record the state of the various hardware elements of the simulation platform at each discrete event or time during a simulation or emulation session to evaluate at a later date.

Processor models typically support the generation of execution traces that track the execution of instructions, register and memory accesses. The simulation platform may also allow the tracing of bus transactions, physical memory accesses and peripheral register values. These execution traces are conventionally created at run-time and can be written to a text file, database, or other log file. Such systems often contain tables mapping the physical addresses and peripheral registers such as a memory map or text file.

As previously noted, when creating debugging and analysis tools for the simulation platform, it is advantageous to have a complete knowledge of the values of system memory. Debuggers use many methods for memory value inspection if they are operating at run-time. However, for debuggers that are used after the simulation or emulation has ended (post-process debuggers), several problems arise. For example, since the simulation and debug session has been terminated, APIs that access memory values at run-time cannot be used.

Additionally, it is not possible to know in advance what memory value(s) a user might want to inspect during a post-processing debug session. Therefore it is useful to know memory values at all time points during the execution of the simulation and debug session. However, a brute force solution that stops the simulation or emulation at each tick of time and dumps the entire state of the memory is inefficient and storage intensive, and might not even work if no API exists for requesting memory values without creating new system side effects.

Accordingly, there is a need in the art for a system that constructs an accurate view of system memory, during a system simulation or emulation, that is available during post-processing debug operations, and without any specific API.

BRIEF DESCRIPTION OF THE DRAWINGS

The foregoing and other aspects of various embodiments of the present invention will be apparent through examination of the following detailed description thereof in conjunction with the accompanying drawing figures in which similar reference numbers are used to indicate functionally similar elements.

DETAILED DESCRIPTION

According to an embodiment, a system and method are provided for constructing an accurate view of system memory over time that works without any special API from the memory model for inspecting memory values. The system memory view can be used with post-processing debug and analysis tools, but could also be employed in a real-time debugger.

The system memory view is constructed by capturing each memory execution transaction, bus transaction, and register transaction during simulation. Each captured transaction is expressed as a message that may be parsed and stored in a memory database. Changes in hardware state may also be captured and stored in a hardware state database. Switches between processes detected during the simulation may cause an update to a simulated register or memory location that will be captured as a change in hardware state and stored in a hardware database. Such process switches may occur when a breakpoint or watchpoint is detected or otherwise inserted or during a transition from a software to a hardware domain during the simulation.

Aspects of the present invention describe a system and method for providing an interface to observe the results of a simulation or emulation of a system having multiple disparate software and hardware components, including embedded software, in a post-processing debug and analysis tool.

The system memory view is created by monitoring data traces. The three basic kinds of data traces captured to create the system memory view include processor execution traces, bus transaction traces, and peripheral register traces.

An execution trace alone will rarely be enough to create an accurate representation of memory, because, for example a peripheral model (e.g. a DMA controller) can read or write directly from or to memory or a memory-mapped peripheral model with memory-mapped registers can respond to a transaction that changes its register values. However, since each memory event generates (or can be inferred from) related bus transactions or register changes, monitoring bus traces and peripheral registers in conjunction with the execution traces will allow construction of an accurate and complete representation of memory.

Figure 1:
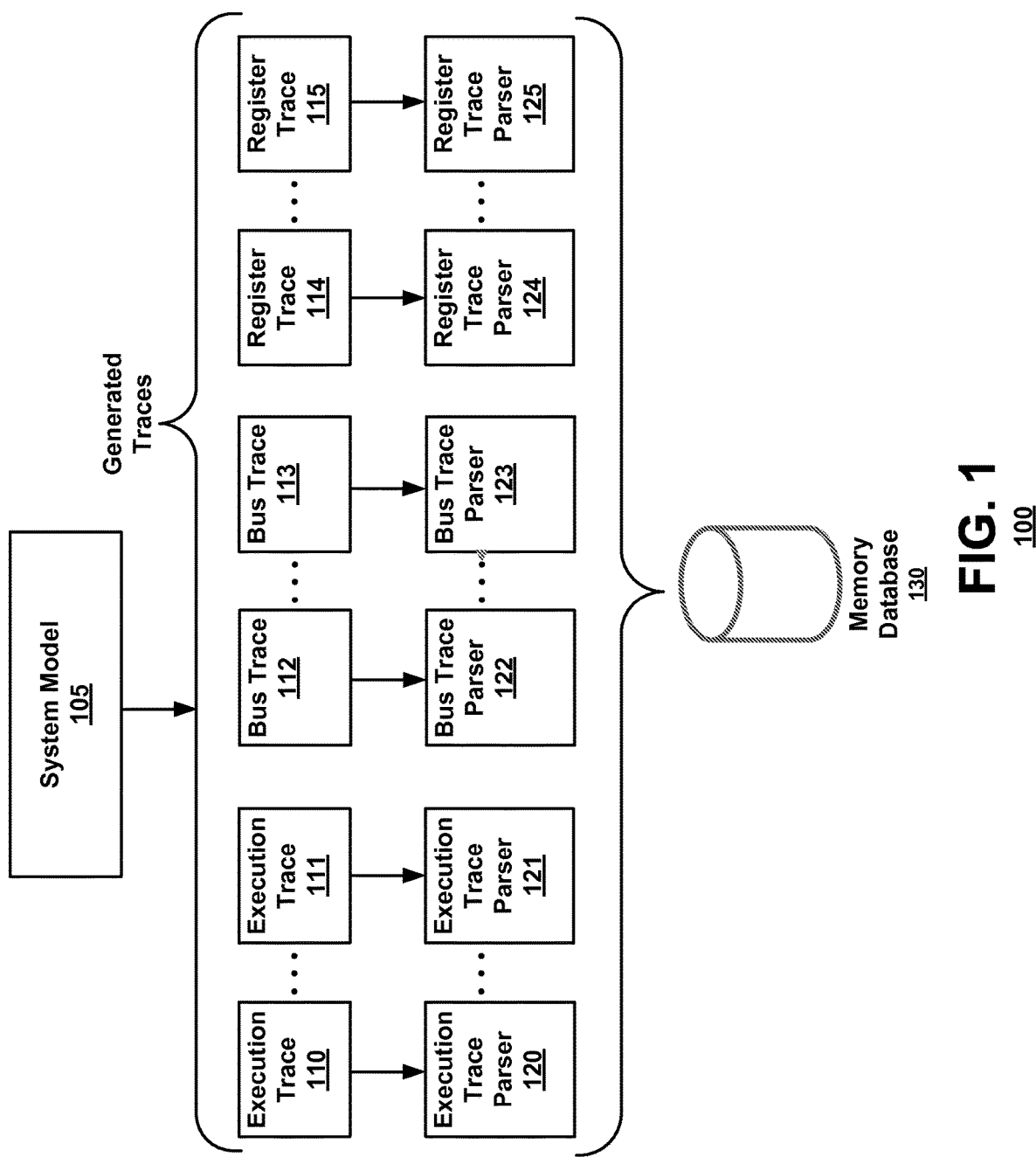
FIG. 1 is a simple block diagram illustrating components of an exemplary system according to an embodiment of the present invention.

FIG. 1 is a simplified block diagram illustrating components of an exemplary system 100 according to an embodiment. As shown in FIG. 1, a system model 105 will produce multiple traces 110-115 during simulation or emulation of the system model 105. The traces will then be captured for later use, for example, with a debugger.

According to an embodiment, the traces could be instantiated in the form of a single file, multiple files, or the trace data could arrive in groups of messages, in a database, etc. The individual traces could even be combined into a single information stream or file.

Then, from the captured traces, a trace event can be extracted. For example, events that occur either at a specific simulation time (e.g., at time 2 ns after simulation or execution start) or that occur in a specific execution sequence (e.g., the event was the 1014th that occurred after simulation or execution commenced) can be identified.

An exemplary execution trace message may include the following information: the device or element that executed the traced action (e.g., Processor X), the action that occurred (e.g., read/write), a length or number of words or lines affected (e.g., 1 word of memory), the value of the word or line (e.g., 0x01), the address that was accessed (e.g., 0x1111212), and the time the event occurred (e.g., 2 ns). The form and contents of the trace message may vary, but should provide sufficient information to extract event information in order to create a complete and accurate view of the system memory over time.

Bus transaction traces can have many formats. For example, the format of a bus trace can vary depending on the standard and system producing the trace, (e.g. the TLM 2.0 standard, ARM Tarmac Memory Bus Trace, etc.). However, a bus trace should include the following information: the initiator or master device that generated the bus transaction, the target or slave device that provides the information requested by the bus transaction, a mode such as read, write, read/write, etc., a time when the transaction occurred, the length of bytes that were requested, the address of the data that was written or read, and the data that was read or written. An exemplary bus trace message (simplified and expressed in human readable form) could be "Device dev1 reads 4 bytes of memory receiving value 0x20 from address 0x122211 of target device memory1 at time 23 ns". The form and contents of the trace message may vary, but should provide sufficient information to extract event information to contribute to a complete and accurate view of the system memory over time.

Similarly, a register trace message may include the device that interacted with the register (e.g., device dev1), the register that was affected (e.g., register R0), the value the register was changed to (e.g., 0x0), and the time the event occurred (e.g., 2 ns). The form and contents of the trace message may vary, but should provide sufficient information to extract event information to contribute to a complete and accurate view of the system memory over time.

For each source of execution, bus, or register transaction, there is a corresponding parser 120-125, that is able to parse out the trace messages to generate information about the specific values of data that resides in memory at a point in time. The parser may also understand register value changes and can build a memory map to map registers to addresses in memory. Hence when a register R0 changes to value 0x0, the parser would know that this implies memory address 0x100000 took the value 0x0 if R0 is mapped to address 0x100000.

When an execution trace parser parses out a message that either shows a memory value that it retrieved by reading from a memory or by writing a value to memory the parser commits the trace to the database 130. When a bus transaction trace parser parses out a bus transaction, it first determines whether the target device of the bus transaction is a memory being tracked in the database 130. If it is, the value that was either written or read is committed to the database 130. Bus transactions for target devices not being tracked may be ignored.

When a peripheral register trace parser parses out a register value change, it first uses a memory map to find out which address in physical memory should be updated when the register changes value. Then the value that was either written or read is committed to the database 130 using the address determined from the memory map.

A memory device such as a database 130 stores a representation of the system memory as a function of time. The database supports read and write operations. For example, an exemplary readMemory command may have the following inputs: a base address in memory, a length, and a time value. The readMemory command will then return the data from memory that was present at that time. The time value may represent simulation time, execution time, sequence, etc. The readMemory command will return either a value that was recorded from the received traces or zero if no trace operation involving the given memory address was discovered during trace parsing. An exemplary writeMemory command will include a base address, a length, a time value, and a data value that will be written to the database. According to an embodiment, the database 130 is a temporal database. Consequently, if no trace event occurred at the precise moment of time requested by the input time value, the database 130 will retrieve the value that was last set by reviewing earlier moments in time to identify the last event that affected that memory (if there was one). According to an embodiment, the database 130 could be implemented as a temporal sparse matrix or a three dimensional matrix.

According to an embodiment, an origination time is the first time when a complete physical memory dump is processed and stored in the memory database 130. This may be a logical time that relates to the time or sequence details of the simulation or execution session and may be some time after the simulation has begun (e.g., at a time greater than time 0). Any read operation that asks for a value at a time before the origination time will result in an error or a response that the value is not known.

According to an embodiment, the origination time may be set to time 0, e.g., when simulation or execution begins. Then all memory values will be presumed to be either 0 or undefined. For simplicity, and to avoid errors, all memory values may be considered to be in the "0" state at this origination time. According to an embodiment at origination time=time 0, the system may be preloaded with values in the database. For example, the initial values may be read from a file such as an Executable and Linkable Format (ELF) or Debugging With Attributed Record Formats (DWARF) compiler created file.

It is possible that multiple trace statements could contain trace messages that represent information about a memory at the same (or very time proximate) instance. For example, a value being read from a register and written to system memory will produce multiple traces. However, all such transactions can safely be written to memory because the trace information provides insight into the state of memory either via a read/write operation. In a properly functioning model or simulation, the values will be the same. According to an embodiment, conflicts of memory captured at substantially the same time may be identified, which could indicate that the model has a bug and give guidance for how to find the bug and correct the problem.

Once a complete and accurate view of system memory over the course of the simulation or emulation is captured, a debug or analysis environment can access the database 130 to read values, for example using a readMemory function, as needed to support desired operations that require knowledge of memory at given points in time.

Capturing trace information and using such information during interactive simulation and debugging is described in further detail in co-pending application, entitled "A Method for Interactive Embedded Software Debugging Through the Control of Simulation Tracing Components," filed concurrently with this application, the disclosures of which is incorporated herein by reference in its entirety.

Figure 2:
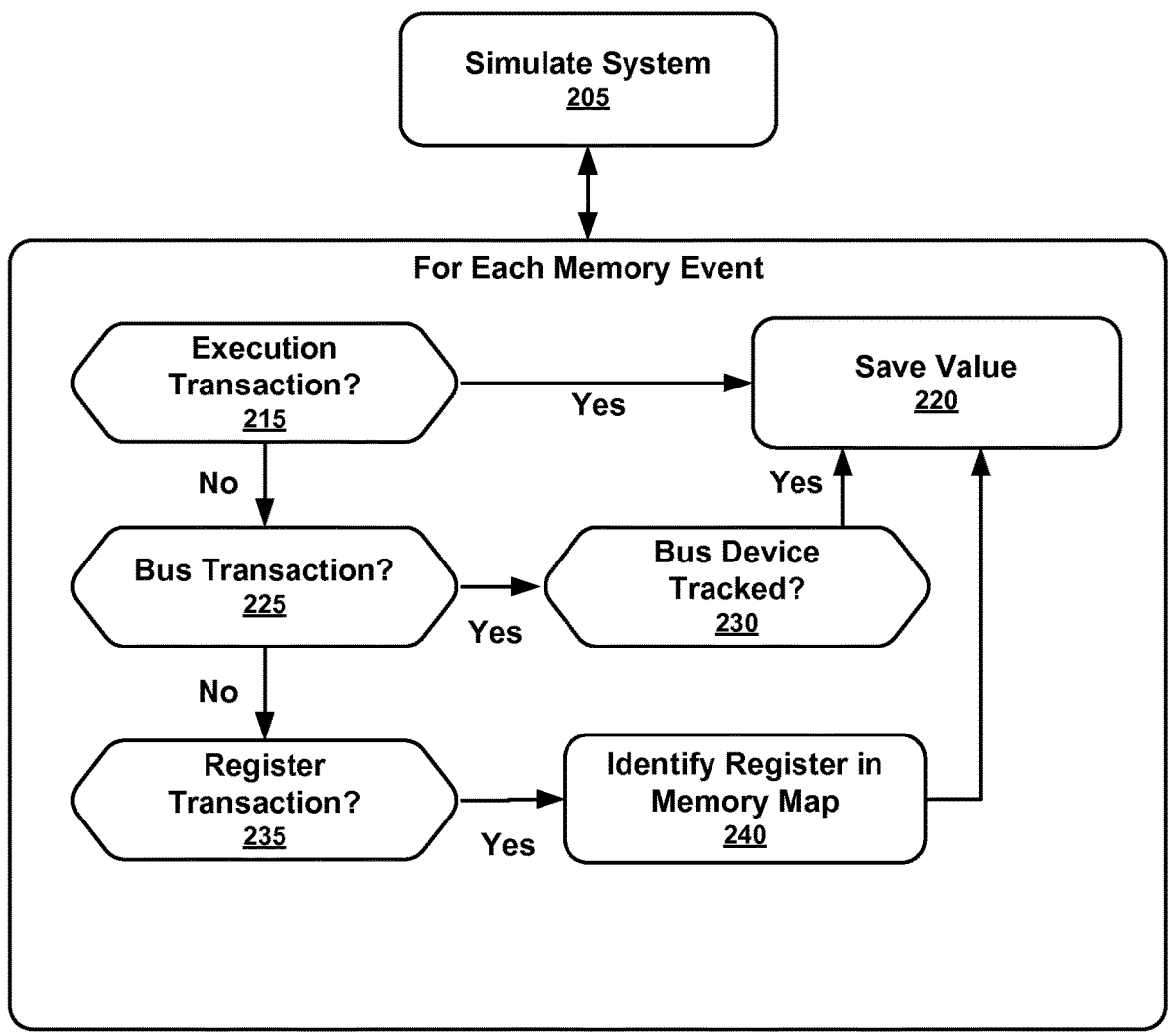
FIG. 2 illustrates an exemplary method for simulating hardware and software components implemented on a simulation platform according to an embodiment of the present invention.

FIG. 2 illustrates an exemplary method according to an embodiment. As shown in FIG. 2, initially a simulation or emulation of a system is initiated (block 205). Then, for each memory event or transaction detected, the trace of the transaction will be parsed. If the memory event is a read/write execution transaction for the system memory (block 215), then the value that was read or written to the memory is written to the memory database (block 220).

If the memory event is a bus transaction (block 225), if the transactions related to the target device of the bus transaction are being tracked (block 230), then the value transmitted on the bus is written to the memory database (block 220). However, if the target device is not being tracked (block 230), then nothing is written to the memory database.

If the memory event is a register transaction (block 235), then the register will be identified in a memory map to identify the address of values associated with the register in the memory database (block 240). If the register was not previously mapped, a new entry in the memory database will be created and the map updated to identify the new entry associated with the register (not shown). Once the register is identified in the memory map, the value stored to or read from the register is saved to the memory database (block 220).

After each memory event is processed, the simulation will continue until the next memory event is detected or the simulation completes. Once the simulation is complete, and there are no more memory events associated with the simulation, the simulation will exit, leaving an accurate copy of the memory at any given time of the simulation.

Figure 3:
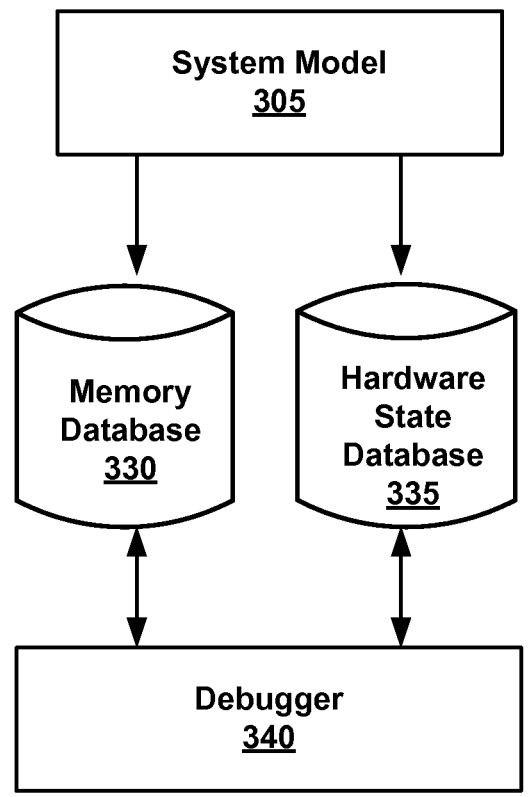
FIG. 3 is a simplified block diagram illustrating components of an exemplary system according to an embodiment.

FIG. 3 is a simplified block diagram illustrating components of an exemplary system according to an embodiment. In FIG. 3, similarly to FIG. 1 above, a system model 305 will produce multiple traces during simulation or emulation of the system model 305. The traces will then be captured and stored for later use in a memory database 330. Additionally, the state of all simulator processor registers will be stored in a hardware state database 335. The combination of the data stored in the memory database 330, the hardware state database 335, and symbolic software debugging information (e.g. Executable and Linkable Format (ELF) and Debugging With Attributed Record Formats (DWARF) compiler created files) will provide an accurate representation of the software state at any time during the simulation. This representation of the software state can later be accessed for example, with a post-processing debugger 340. The post-processing debugger can also access the state of hardware or memory at any point of the recorded simulation and compare the hardware and memory state to identify discrepancies. Therefore the debugger can be used to access information for the entire simulation platform including the software of the OS and the processes and threads of the platform, as well as the traces saved in the memory database.

According to an embodiment, a representation of embedded OS data structures and entry points will be used with the memory database 330 and hardware database 335 to implement post-processing debug and analysis capabilities for software processes and threads that were executed on the OS during simulation or emulation.

For example, a Program Counter (PC) register value that represents the location of a function in the embedded OS software that switches between processes can be searched forward or backward in the hardware state database. Similarly to the capture of the memory image in the memory database 330, this information may be captured and stored in the hardware database 335. The PC register will be monitored during simulation of the system model 305 and when a register event, transaction, or other change is detected, and trace will be transmitted to a register parser (not shown). The parser will parse the register trace and store the relevant information in the hardware state database 335. The capture of the PC register will capture the execution flow of bare-metal software and applications programs at an instruction level.

During post-process debug or other post-processing operations, when the desired PC value is found at a particular time point, then the values of memory from the memory database 330 and processor registers from the hardware state database 335 corresponding to that time point can be retrieved to reconstruct the values in OS process tables and other data structures at that particular time point. This information allows the addresses associated with arbitrary source functions or source lines in the OS process or thread that was scheduled to start at that time point to be calculated (again with the help of the symbolic software debugging information associated with the process or image running on the OS). This PC address can then be searched through in the hardware state database 335 to follow the particular line or function until a different PC value is encountered. An analogous algorithm can be devised for examining symbolic variable values in an arbitrary OS process or thread which has associated symbolic software debugging data. Similarly, values of important CPU registers can be recorded.

The insertion or creation of complex breakpoint conditions within a simulation platform is described in further detail in co-pending U.S. application Ser. Nos. 13/907,516, 13/907,474, and 13/907,566, the disclosures of which are incorporated herein by reference in their entirety.

Once the simulation has completed, and the memory and hardware databases have been populated, the captured information may be stepped through during post-processing operations. For example, a user may identify a new complex breakpoint condition according to a specified value of a variable. Then the post processing debugger will search or step through the known values of the variable as stored in the memory or hardware database in order to identify the breakpoint. This search can be performed forward or backward in time within the simulation time captured by the databases.

According to an embodiment, identifiers are constructed which unambiguously designate a particular state or element associated with a particular instance of a modeled hardware component or a particular instance, element or object of a modeled software component in the context of the entire captured simulation. Implementing global identifiers for each instance of a modeled element allows such identifiers to appear in condition expressions and action statements in the post-processing control interface and defines mechanisms for the control interface to query the memory database and the hardware state database as appropriate. Unique and unambiguous identifiers are further described in the aforementioned co-pending U.S. patent applications.

According to an embodiment of the present invention, to facilitate stepping through the source code of the modeled components with the post process debugger, breakpoints may be inserted as described above. During simulation, execution control may transition between the embedded software and the simulation control thread. When an operation crosses the software and hardware domains so that either the next software or hardware source code line, as appropriate, will be executed, the transition will be recorded, for example in the PC register. A user can then step through the actions performed and captured during simulation. For example, the debugger may cross the software and hardware domains so that either the next software or hardware source code line, as appropriate, will be shown to have been executed next to the user of the debugger. The user can then step through the executed lines in order from any identified point in the captured simulation. Additionally, the user will be able to step backward in time within the captured simulation.

Stepping between domains during simulation is further described in the aforementioned co-pending U.S. patent applications.

Figure 4:
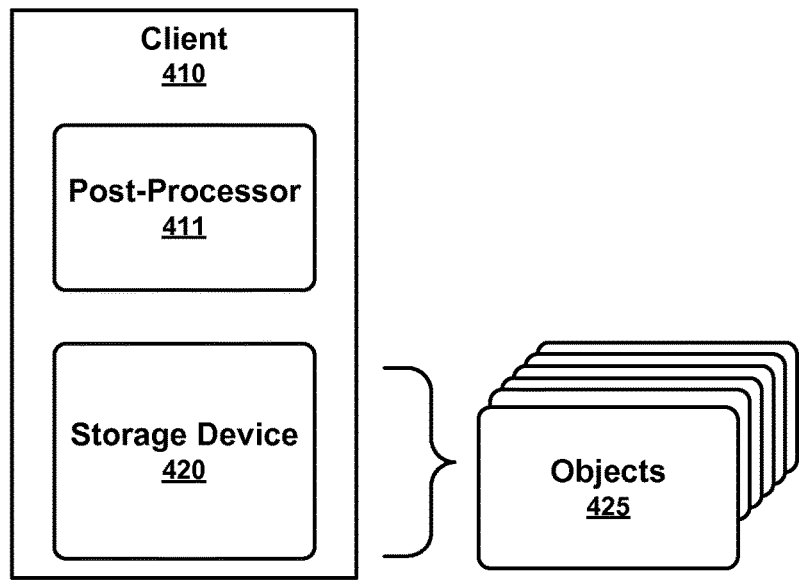
FIG. 4 is a simple block diagram illustrating components of an exemplary system according to an embodiment.

A user may access a post-processing interface in a stand-alone client system, client-server environment, or a networked environment. FIG. 4 is a simple block diagram illustrating components of an exemplary system 400 according to an embodiment. As shown in FIG. 4, a system 400 may comprise a client 410 executing a post-processor 411 and having a memory storage 420. The client 410 may be any computing system that executes a post-processor 411 or otherwise facilitates access to memory storage 420, for example a personal computer. The client 410 may include a processor that performs a method in accordance with the disclosed embodiments. Such a client would be part of an overall simulation system in accordance with the disclosed embodiments.

Hardware models, instruction sets, software packages, the hardware state database, the memory database, and other objects 425 used by the simulation system may be stored in memory storage 420. A user may access the objects 425 stored in memory storage 420 with the client 410 via a post-processing interface, where the post-processing interface is capable of accessing memory storage 420 and displaying the objects 425 and the data associated with the simulation. The post-processing interface may include a user interface, for example a program, application or middleware that acts as a frontend to and facilitates access to objects in memory storage 420. The post-processing interface may facilitate observability into the captured simulation of the modeled components using the display and edit tools and procedures described herein. The user may interact with the post-processing interface through a number of input devices, such as by inputting a selection as with a mouse or inputting a request as with a keyboard. The user may observe the simulation results on an output device or display. The post-processing interface may run in an application window controlled by the user.

As shown in FIG. 4, a client 410 may be a stand-alone system, as may be of particular interest where the components simulated are highly confidential. Additionally, according to an aspect of an embodiment as shown in FIG. 5, a client 510 may be part of a networked environment.

Figure 5:
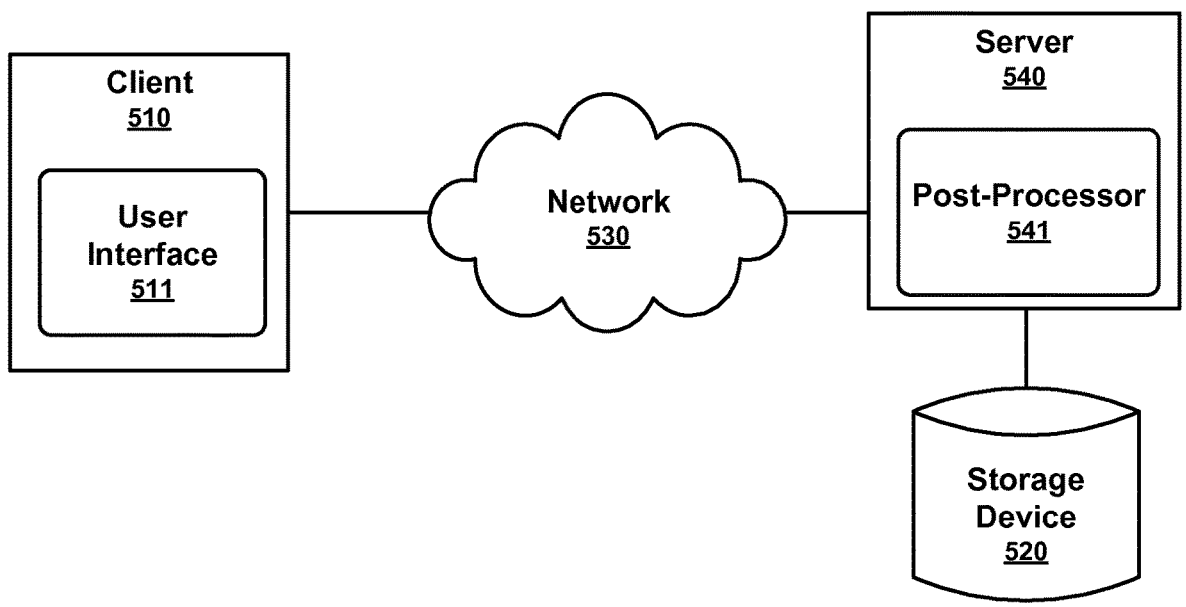
FIG. 5 is a simple block diagram illustrating components of an exemplary system according to an embodiment.

FIG. 5 is a simple block diagram illustrating components of an exemplary system 500 according to an embodiment. As shown in FIG. 5, system 500 may include a client 510 having a user interface 511. The client 510 may be connected to a server 540 via a network 530. The post-processor 541, which in this embodiment is located at server 540, may have access to storage device 520 storing hardware models, instruction sets, software packages, a hardware state database, a memory database, and other objects utilized by the simulation system. The server 540 may include a processor that performs a method in accordance with the disclosed embodiments. Such a server then would be part of the overall simulation system in accordance with the disclosed embodiments.

A user may access a post-processor 541 at the server 540 via the client 510 having a user interface 511 capable of accessing and displaying the information captured during simulation. The client 510 may be any computing system that facilitates the user accessing storage device 520, for example a personal computer. The network 530 may be a wired or wireless network that may include a local area network (LAN), a wireless area network (WAN), the Internet, or any other network available for accessing storage device 520 from the client 510.

The server 540 may be a network server accessible to the client 510 via the network 530 that may manage access to storage device 520. The user interface 511 may receive instructions regarding analyzing a simulation from the user and utilizing the objects stored in memory storage 520, facilitate a display of the simulation results queried from the described databases. Multiple different clients (not shown) may access storage device 520 via the network 530 and request access to the objects stored therein.

In another networked environment, the post-processor may be executed on a network capable client and access the other objects stored in one or more storage devices via a network and communications server.

Figure 6:
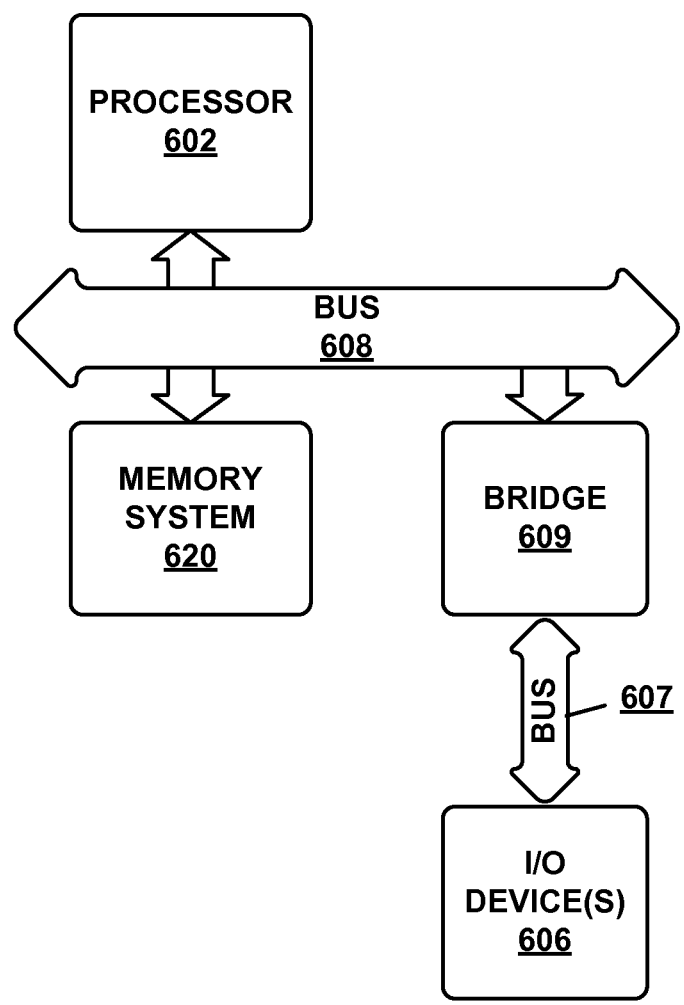
FIG. 6 is a simple block diagram illustrating components of an exemplary client according to an embodiment of the present invention.

FIG. 6 is a simple block diagram illustrating components of an exemplary client 610 according to an embodiment of the present invention. As shown in FIG. 6, the client 610 configured to execute the post-processor as described herein may include a processor 602, a memory system 620 and one or more input/output (I/O) devices 606 in communication. The communication can be implemented in a variety of ways and may include one or more computer buses 607, 608 and/or bridge devices 609 as shown in FIG. 6. The I/O devices 606 can include network adapters and/or mass storage devices from which the client 610 can receive commands for executing the simulation.

In some applications, the modules described hereinabove may be provided as elements of an integrated software system, in which the blocks may be provided as separate elements of a computer program. Some embodiments may be implemented, for example, using a non-transitory computer-readable storage medium or article which may store an instruction or a set of instructions that, if executed by a processor, may cause the processor to perform a method in accordance with the embodiments. Other applications of the present invention may be embodied as a hybrid system of dedicated hardware and software components. Moreover, not all of the modules described herein need be provided or need be provided as separate units. Additionally, the arrangement of the blocks in FIG. 3 do not necessarily imply a particular order or sequence of events, nor are they intended to exclude other possibilities. For example, the operations depicted at blocks 315, 325, and 335 may occur in any order or substantially simultaneously with each other. Such implementation details are immaterial to the operation of the present invention unless otherwise noted above.

The exemplary methods and computer program instructions may be embodied on a non-transitory computer readable storage medium that may include any medium that can store information. Examples of a computer readable storage medium include electronic circuits, semiconductor memory devices, ROM, flash memory, erasable ROM (EROM), floppy diskette, CD-ROM, optical disk, hard disk, fiber optic medium, or any electromagnetic or optical storage device. In addition, a server or database server may include computer readable media configured to store executable program instructions. The features of the embodiments of the present invention may be implemented in hardware, software, firmware, or a combination thereof and utilized in systems, subsystems, components or subcomponents thereof.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A computer-implemented method, the method comprising:
    capturing, during a simulation of a system model and a system memory model, an execution transaction in response to determining that an execution memory-event is one of reading from the system memory model and writing to the system memory model, wherein the captured execution transaction is expressed as an execution trace message;
    capturing, during the simulation of the system model, a bus transaction in response to determining that a bus memory event is one of reading from a bus and writing to the bus, wherein the captured bus transaction is expressed as a bus trace message;
    capturing, during the simulation of the system model, a register transaction in response to determining that a register memory event is one of reading from a register model and writing to the register model, wherein the captured register transaction is expressed as a register trace message;
    capturing, during the simulation of the system model, switches in processes that cause an update to a memory state;
    storing, during the simulation of the system model, the execution trace message, the bus trace message, and the register trace message in a memory database, wherein the memory database provides a representation of the system memory model during the simulation of the system model;
    storing, during the simulation of the system model, the switches in processes that cause an update to a memory state in a hardware state database;
    accessing, after the simulation of the system model, the register trace message and one of the execution trace message and bus trace message in the memory database;
    accessing, after the simulation of the system model, a memory state in the hardware state database, wherein the memory database and hardware database provide an accessible representation of the system model; and
    debugging, after the simulation of the system model, the system model based on the accessed memory state, register trace message and one of the accessed bus trace message and the execution trace message.

2. The computer-implemented method of claim 1, further comprising parsing, during the simulation of the system model, the execution trace message, the bus trace message, and the register trace message.

3. The computer-implemented method of claim 2, further comprising:
    determining if a target device for the bus transaction is being tracked in the memory database; and
    one of:
        storing the bus trace message in response to determining that the target device for the bus transaction is being tracked in the memory database; and
        ignoring the bus trace message for the target device in response to determining that the target device for the bus transaction is not being tracked in the memory database.

4. The computer-implemented method of claim 2, wherein the parsing comprises identifying the register associated with the register trace message in a memory map and storing the register trace message at an address in the memory database based on the memory map.

5. The computer-implemented method of claim 1, wherein at a start of the simulation of the system model values in the memory database are set to zero or undefined.

6. The computer-implemented method of claim 1, wherein at a start of the simulation of the system model given values are loaded into the memory database and associated with addresses of the system memory model.

7. The computer-implemented method of claim 6, wherein the memory database is not accessible during the simulation of the system model until the simulation is completed corresponding to a complete memory dump.

8. The computer-implemented method of claim 1, further comprising querying, after the simulation of the system model, the memory database with an identifier representing one of a hardware model and a software model of the system model.

9. The computer-implemented method of claim 1, further comprising querying, after the simulation of the system model, the memory database to identify a time the simulation of the system memory model had a given value to implement a complex breakpoint.

10. The computer-implemented method of claim 1, further comprising capturing, during the simulation of the system model, a change in a hardware model and storing, during the simulation of the system model, the captured change in a hardware state database, wherein for each change during the simulation of the system model updating a program counter (PC) register model and storing the update in the hardware state database.

11. The computer-implemented method of claim 10, further comprising stepping through, after the simulation of the system model, one of the memory database and the hardware database, in one of forward in capture time or backward in capture time, to display a series of steps corresponding to one of a software source and a hardware model source performed during the simulation of the system model.

12. The computer-implemented method of claim 10, further comprising querying, after the simulation of the system model, the hardware state database to find a PC register value corresponding to a specified software line or function which is associated with one of a program, an operating system, a process, and a thread.

13. The method of claim 10, further comprising querying, after the simulation of the system model, the hardware state database for a given value to implement a complex breakpoint in a post-process debugger.

14. The computer-implemented method of claim 1, wherein the debugging comprises querying the memory database based on input parameters for data at a given instance of time during the simulation of the system model.

15. The computer-implemented method of claim 14, wherein the input parameters comprise: a memory address for corresponding data in the system memory model, a length of the corresponding data, and a time value corresponding to the given instance of time.

16. The computer-implemented method of claim 14, further comprising, providing, after the simulation of the system model, on a display the queried data at the given instance of time during the simulation of the system model.

17. The computer-implemented method of claim 1, further comprising:
    detecting, during the simulation of the system model, a change in a state of a hardware model, the change in the state corresponding to a switch from a given process to another process by a function of the hardware model, wherein the switch causes an update to a program counter (PC) register model;
    capturing, during the simulation of the system model, the update to the PC register model; and
    storing, during the simulation of the system model, the captured update in a hardware state database, wherein the captured update characterize an executing flow of a software or an application program at an instruction level.

18. The computer-implemented method of claim 17, further comprising searching, after the simulation of the system model, variables stored in the memory database and the hardware state database to identify a breakpoint condition.

19. The computer-implemented method of claim 1, further comprising:
    capturing, during the simulation of the system model, state changes of processor register models; and
    storing, during the simulation of the system model, the captured state changes in a hardware state database.

20. The computer-implemented method of claim 19, further comprising:
    searching, after the simulation of the system model, the hardware state database to locate a given program counter value associated with a given point in time during the simulation of the system model;
    retrieving, after the simulation of the system model, values from the memory database associated with the given point in time during the simulation of the system model;
    retrieving, after the simulation of the system model, values from the hardware state database associated with the given point in time during the simulation of the system model; and
    generating, after the simulation of the system model, an operating system (OS) process table based on the retrieved values from the memory database and the retrieved values from the hardware database.

21. A system comprising:
    a memory to store data comprising machine readable instructions and a system model and a system memory model;
    a processor configured to access the memory and execute the machine readable instructions to:
        capture, during a simulation of the system model, an execution transaction in response to determining that an execution memory event is one of reading from the system memory model or writing to the system memory model, wherein the captured execution transaction is expressed as an execution trace message;
        capture, during the simulation of the system model, a bus transaction in response to determining that a bus memory event is one of reading from a bus and writing to the bus, wherein the captured bus transaction is expressed as a bus trace message;
        capture, during the simulation of the system model, a register transaction in response to determining that a register memory event is one of reading from a register model and writing to the register model, wherein the captured register transaction is expressed as a register trace message;
        capture, during the simulation of the system model, switches in processes that cause an update to a memory state;
        track, during the simulation of the system model, in a the memory database, a target device associated with the bus transaction;
        selectively store, during the simulation of the system model, the bus trace message in the memory database based on whether the target device is being tracked in the memory database
        store, during the simulation of the system model, the execution trace message, and the register trace message in the memory database, wherein the memory database provides a representation of the system memory model during the simulation of the system model;
        store, during the simulation of the system model, the switches in processes that cause an update to a memory state in a hardware state database;
        access, after the simulation of the system model, in the memory database, the register trace message and one of the execution trace message and bus trace message during a debugging operation;
        access, after the simulation of the system model, in the hardware state database, a memory state, wherein the memory database and hardware database provide an accessible representation of the system model
        debugging, after the simulation of the system model, the system model based on the accessed memory state, the register trace message, and one of the accessed bus trace message and the execution trace message.

22. The system of claim 21, wherein the machine-readable instructions further configure, during the simulation of the system model, the processor to parse the execution trace message, the bus trace message, and the register trace message.

23. The system of claim 22, wherein the machine-readable instructions further configure, during the simulation of the system model, the processor to:
    determine if the target device for the bus transaction is being tracked in the memory database, and one of:
        store the bus trace message in response to determining that the target device for the bus transaction is being tracked in the memory database; and
        ignore the bus trace message for the target device in response to determining that the target device for the bus transaction is not being tracked in the memory database.

24. The system of claim 22, wherein the machine-readable instructions further configure, during the simulation of the system model, the processor to determine the register associated with the register trace message in a memory map and store the register trace message at an address in the memory database based on the memory map.

25. The system of claim 21, wherein the debugger is further configured to query, after the simulation of the system model, the memory database with an identifier representing one of a hardware component and a software component of the system model.

26. The system of claim 21, wherein the debugger is further configured to query, after the simulation of the system model, the memory database to identify a time the simulation of the system model had a given value to implement a complex breakpoint.

27. The system of claim 21, wherein the memory further comprises a hardware state database to store a change in a hardware model during the simulation of the system model, wherein the machine-readable instructions further configure, during the simulation of the system model, the processor to update a program counter (PC) register model for each change during the simulation of the system model and store the update in the hardware state database.

28. The system of claim 27, wherein the debugger is further configured to query, after the simulation of the system model, the hardware state database for a given value to implement a complex breakpoint.

29. The system of claim 28, wherein the debugger is further configured to step through, after the simulation of the system model, one of the memory database and the hardware state database, in one of forward in capture time and backward in capture time, to display a series of steps corresponding to one of a software source and a hardware model source performed during the simulation of the system model.

* * * * *